US009411042B2

(12) United States Patent
Brady et al.

(10) Patent No.: US 9,411,042 B2
(45) Date of Patent: Aug. 9, 2016

(54) MULTI-SENSOR COMPRESSIVE IMAGING

(71) Applicant: Duke University, Durham, NC (US)

(72) Inventors: David Brady, Durham, NC (US); Tom Driscoll, San Diego, CA (US); John Hunt, Knoxville, TN (US); Daniel Marks, Durham, NC (US); Alexander Mrozack, Durham, NC (US); Matthew Reynolds, Durham, NC (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 87 days.

(21) Appl. No.: 14/511,845

(22) Filed: Oct. 10, 2014

(65) Prior Publication Data
US 2015/0030256 A1    Jan. 29, 2015

Related U.S. Application Data

(63) Continuation-in-part of application No. 13/891,165, filed on May 9, 2013, and a continuation-in-part of application No. PCT/US2013/040444, filed on May 9, 2013.

(Continued)

(51) Int. Cl.
*G01S 13/89* (2006.01)
*H01Q 21/06* (2006.01)
*H01Q 3/24* (2006.01)
*G01S 13/88* (2006.01)
(Continued)

(52) U.S. Cl.
CPC ............... *G01S 13/89* (2013.01); *G01H 17/00* (2013.01); *G01S 13/887* (2013.01); *G01S 17/89* (2013.01); *H01Q 3/24* (2013.01); *H01Q 15/0086* (2013.01); *H01Q 21/061* (2013.01)

(58) Field of Classification Search
None
See application file for complete search history.

(56) References Cited

U.S. PATENT DOCUMENTS 4,072,949 A    2/1978   Brunt
4,866,448 A    9/1989   Rocca et al.
(Continued)

FOREIGN PATENT DOCUMENTS

WO    2010021736 A2    2/2010
WO    2011114746 A1    9/2011
WO    2012050614 A1    4/2012

OTHER PUBLICATIONS

M. Sarkis and K. Diepold, "Depth map compression via compressed sensing," Image Processing (ICIP), 2009 16th IEEE International Conference on, Cairo, 2009, pp. 737-740. doi: 10.1109/ICIP.2009. 5414286 Accessed on Mar. 19, 2016 at http://ieeexplore.ieee.org/xpl/articleDetails.jsp?arnumber=5414286&newsearch=true &queryText=sarkis%20compressed%20sen.*

(Continued)

*Primary Examiner* — Utpal Shah
*Assistant Examiner* — Kate R Duffy
(74) *Attorney, Agent, or Firm* — Olive Law Group, PLLC

(57) ABSTRACT

Multi-sensor compressive imaging systems can include an imaging component (such an RF, microwave, or mmW metamaterial surface antenna) and an auxiliary sensing component (such as an EO/IR sensor). In some approaches, the auxiliary sensing component includes a structured light sensor configured to identify the location or posture of an imaging target within a field of view of the imaging component. In some approaches, a reconstructed RF, microwave, or mmW image may be combined with a visual image of a region of interest to provide a multi-spectral representation of the region of interest.

40 Claims, 7 Drawing Sheets

Related U.S. Application Data

(60) Provisional application No. 61/644,736, filed on May 9, 2012, provisional application No. 61/753,584, filed on Jan. 17, 2013, provisional application No. 61/890,043, filed on Oct. 11, 2013.

(51) Int. Cl.
  *H01Q 15/00* (2006.01)
  *G01H 17/00* (2006.01)
  *G01S 17/89* (2006.01)

(56) References Cited

U.S. PATENT DOCUMENTS

| | | | |
|---|---|---|---|
| 5,079,735 | A | 1/1992 | Apostolos |
| 5,943,006 | A | 8/1999 | Crane et al. |
| 7,280,068 | B2 | 10/2007 | Lee et al. |
| 7,646,924 | B2 | 1/2010 | Donoho |
| 7,688,068 | B2 | 3/2010 | Beatty |
| 7,928,893 | B2 | 4/2011 | Baraniuk et al. |
| 7,944,392 | B2 | 5/2011 | Falk |
| 8,014,616 | B2 | 9/2011 | Chakraborty et al. |
| 8,681,047 | B2 | 3/2014 | Egri et al. |
| 2009/0146895 | A1 | 6/2009 | Drexler et al. |
| 2010/0177164 | A1 | 7/2010 | Zalevsky et al. |
| 2011/0123192 | A1 | 5/2011 | Rosenthal et al. |
| 2011/0187577 | A1 | 8/2011 | Fuller et al. |
| 2011/0241934 | A1 | 10/2011 | Sarkis |
| 2011/0267221 | A1 | 11/2011 | Brundick et al. |
| 2011/0273320 | A1 | 11/2011 | Nogueira-Nine |
| 2012/0019892 | A1 | 1/2012 | Bowers et al. |
| 2012/0194399 | A1 | 8/2012 | Bily et al. |
| 2013/0335256 | A1 | 12/2013 | Smith et al. |

OTHER PUBLICATIONS

Willett RM, Marcia RF, Nichols JM; Compressed sensing for practical optical imaging systems: a tutorial. Opt. Eng. 0001;50(7):072601-072601-13. doi:10.1117/1.3596602.*
L. C. Potter, E. Ertin, J. T. Parker and M. Cetin, "Sparsity and Compressed Sensing in Radar Imaging," in Proceedings of the IEEE, vol. 98, No. 6, pp. 1006-1020, Jun. 2010. doi: 10.1109/JPROC.2009.2037526.*
Baena, J. D. et al., Equivalent-Circuit Models for Split-Ring Resonators and Complementary Split-Ring Resonators Coupled to Planar Transmission Lines, IEEE Transactions on Microwave Theory and Techniques, vol. 53:4, Apr. 2005, pp. 1451-1461.
Bioucas-Dias, J.M. et al., A New TwIST: Two-Step Interative Shrinkage/Trhesholding Algorithms for Image Restoration, IEEE Transactions on Image Processing, vol. 16:12, Dec. 2007, 2992-3004.
Brady, D. J. et al., Compressive Holography, Optics Express, Jul. 20, 2009, vol. 17:15, 10 pages.
Caloz & Itoh, Radiated-Wave Applications, Electromagnetic Metamaterials: Transmission Line Theory and Microwave Applications (2005) pp. 261-282.
Candes, E. J., Compressive sampling; Proceedings on the International Congress of Mathematics, Madrid Spain, 2006, copyright 2006 European Mathematical Society, 20 pages.
Candès, E. J., The Restricted Isometry Property and Its Implications for Compressed Sensing, Comptes Rendus Mathematique. 346, 589-592 (May 2008).
Chan et al., A spatial light modulator for terahertz radiation, Lasers and Electro-optics, 2009 Conference on Quantum Electronics and Laser Science Conference. CLEO/QELS 2009. pp. 1-2.
Chan, W. L. et al., A single-pixel terahertz imaging system based on compressed sensing, Applied Physics Letters 93, 121105 (2008), 93-95.
Chan, W. L. et al., A spatial light modulator for terahertz beams, Applied Physics Letters 94, 213511 (2009), 94-96.
Chen, H-T. et al., Active terahertz metamaterial devices, Nature, vol. 444:30, Nov. 2006, 597-600, DOI:10.1038/nature05343.
Cull, C. F. et al., Millimeter-wave compressive holography, Applied Optics, vol. 49:19, E67-82 (Jul. 2010).
Donoho, D. L. D., Compressed Sensing, IEEE Transactions on Information Theory. vol. 52:4, 1289-1306 (2006) http://ieeexplore.ieee.org/xpls/abs_all.jsp?arnumber=1614066.
Driscoll, T. et al., Free-space microwave focusing by a negative-index gradient lens, Applied Physics Letters 88, 081101 (2066).
Driscoll, T. et al., Memory Metamaterials, Science 325, 1518 (2009); DOI: 10.1126/science.1176580.
Hunt, John et al., Metamaterial Microwave Holographic Imaging System, Sep. 4, 2014, pp. 2109-2119, vol. 31, No. 10, Optical Society of America, U.S.
Ikeda et al., Beam-Scanning Performance of Leaky-Wave Slot-Array Antenna on Variable Stub-Loaded Left-Handed Waveguide, Proceedings of ISAP2007, (2007), pp. 1462-1465, ISBN: 978-4-88552-223-9, http://ap-s.ei.tuat.ac.jp/isapx/2007/pdf/4E3-2.pdf.
Kundtz, N. and Smith, D.R., Extreme-angle broadband metamaterial lens, Nature Materials, vol. 9, Feb. 2010, pp. 129-132, published online Dec. 20, 2009; DOI:10.1038/NMAT2610.
Liu et al., Dominant mode leaky-wave antenna with backfire-to-endfire scanning capability, Electronics Letters (2002) vol. 38 No. 23, pp. 1414-1416.
Liu, R. et al., Gradient index circuit by waveguided metamaterials, Applied Physics Letters 94, 073506 (2009), 94-96.
Mahalanobis, A. et al., Off-axis sparse aperture imaging using phase optimization techniques for application in wide-area imaging systems, Applied Optics, vol. 48:28, Oct. 2009, pp. 5212-5224.
Narimanov, E., Metamaterials to beat the static, Nature Materials. 7 (Apr. 2008), pp. 273-274.
Nguyen et al., Pencil-Beam Full-Space Scanning 2D CRLH Leaky-Wave Antenna Array, Signals, Systems and Electronics, 2007, International Symposium on IEEE, pp. 139-142.
Padilla, W. J. et al., Dynamical Electric and Magnetic Metamaterial Response at Terahertz Frequencies, CM17.pdf, Optical Society of America, OCIS codes: (320.7150) Ultrafast spectroscopy; (230.1150) All-optical devices; IEEE, 1-55752-813-6, 2006.
International Search Report and Written Opinion for PCT/US2013/040444; May 21, 2014.
Pendry, J. B. et al., Controlling Electromagnetic Fields, Science 312, 1780 (2006); DOI: 10.1126/science.1125907.
Potter, L. C. and Parker, J. T., Sparsity and Compressed Sensing in Radar Imaging, Proceedings of the IEEE, vol. 98:6, Jun. 2010; pp. 1006-1020.
Shrekenhamer, D. et al., High speed terahertz modulation from metamaterials with embedded high electron mobility transistors, Optics Express, vol. 19:10, May 2011, pp. 9968-9975.
Takhar, D. et al., A New Compressive Imaging Camera Architecture using Optical-Domain Compression, (2006) 10 pages.
Urzhumov, Y. and Smith, D.R., Metamaterial-Enhanced Coupling betweeen Magnetic Dipoles for Efficient Wireless Power Transfer, arXiv:1102.2281v2, physics.class-ph, Feb. 16, 2011; Physical Review B. 83, 31-33 (May 2011) http://prb.aps.org/abstract/PRB/v83/i20/e205114.
Willett, R.M. et al., Compressed sensing for practical optical imaging systems: a tutorial, Optical Engineering 50(7), 072601-1 (Jul. 2011).
Xu, Z. et al., Image reconstruction using spectroscopic and hyperspectral information for compressive terahertz imaging., J. Opt. Soc. Am. A, vol. 27, No. 7, Jul. 2010, pp. 1638-1646.
International Search Report and Written Opinion for PCT/US2014/060080; Feb. 26, 2015.

* cited by examiner (A = $10^2$ ohms, B = $10^3$ ohms, C = $10^4$ ohms)

US 9,411,042 B2

MULTI-SENSOR COMPRESSIVE IMAGING

CROSS-REFERENCE TO RELATED APPLICATIONS

This application claims priority to and is a continuation-in-part patent application of U.S. patent application Ser. No. 13/891,165, entitled METAMATERIAL DEVICES AND METHODS OF USING THE SAME, naming DAVID BRADY, TOM DRISCOLL, JOHN HUNT, DANIEL MARKS, ALEXANDER MROZACK, MATTHEW REYNOLDS, DAVID R. SMITH as inventors, filed May 9, 2013 and later published as United States Patent Application Publication No. 2013/0335256, which claims priority to U.S. Provisional Patent Application No. 61/644,736, entitled METAMATERIAL DEVICES AND METHODS OF USING THE SAME, naming DAVID R. SMITH, DAVID BRADY, TOM DRISCOLL, JACK HUNT, ALEXANDER MROZACK, MATTHEW REYNOLDS, and DANIEL MARKS as inventors, filed May 9, 2012, and to U.S. Provisional Patent Application No. 61/753,584, entitled METAMATERIAL DEVICES AND METHODS OF USING THE SAME, naming DAVID R. SMITH, DAVID BRADY, TOM DRISCOLL, JACK HUNT, ALEXANDER MROZACK, MATTHEW REYNOLDS, and DANIEL MARKS as inventors, filed Jan. 17, 2013; the entire contents of which are hereby incorporated by reference in their entireties.

This application claims priority to and is a continuation-in-part patent application of PCT Application No. PCT/US13/40444, entitled METAMATERIAL DEVICES AND METHODS OF USING THE SAME, naming DAVID BRADY, TOM DRISCOLL, JOHN HUNT, DANIEL MARKS, ALEXANDER MROZACK, MATTHEW REYNOLDS, DAVID R. SMITH as inventors, filed May 9, 2013 and later published as PCT Publication No. WO/2014/025425, is related to the present application, the entire content of which is hereby incorporated by reference in its entirety.

The present application claims benefit of priority of U.S. Provisional Patent Application No. 61/890,043, entitled MULTI-SENSOR COMPRESSIVE IMAGING, naming DAVID BRADY, TOM DRISCOLL, JOHN HUNT, DANIEL MARKS, ALEXANDER MROZACK, MATTHEW REYNOLDS, DAVID R. SMITH as inventors, filed Oct. 11, 2013, which was filed within the twelve months preceding the filing date of the present application, and the entire content of which is hereby incorporated by reference in its entirety.

All subject matter of the above applications is incorporated herein by reference to the extent such subject matter is not inconsistent herewith.

DETAILED DESCRIPTION

Figure 1:
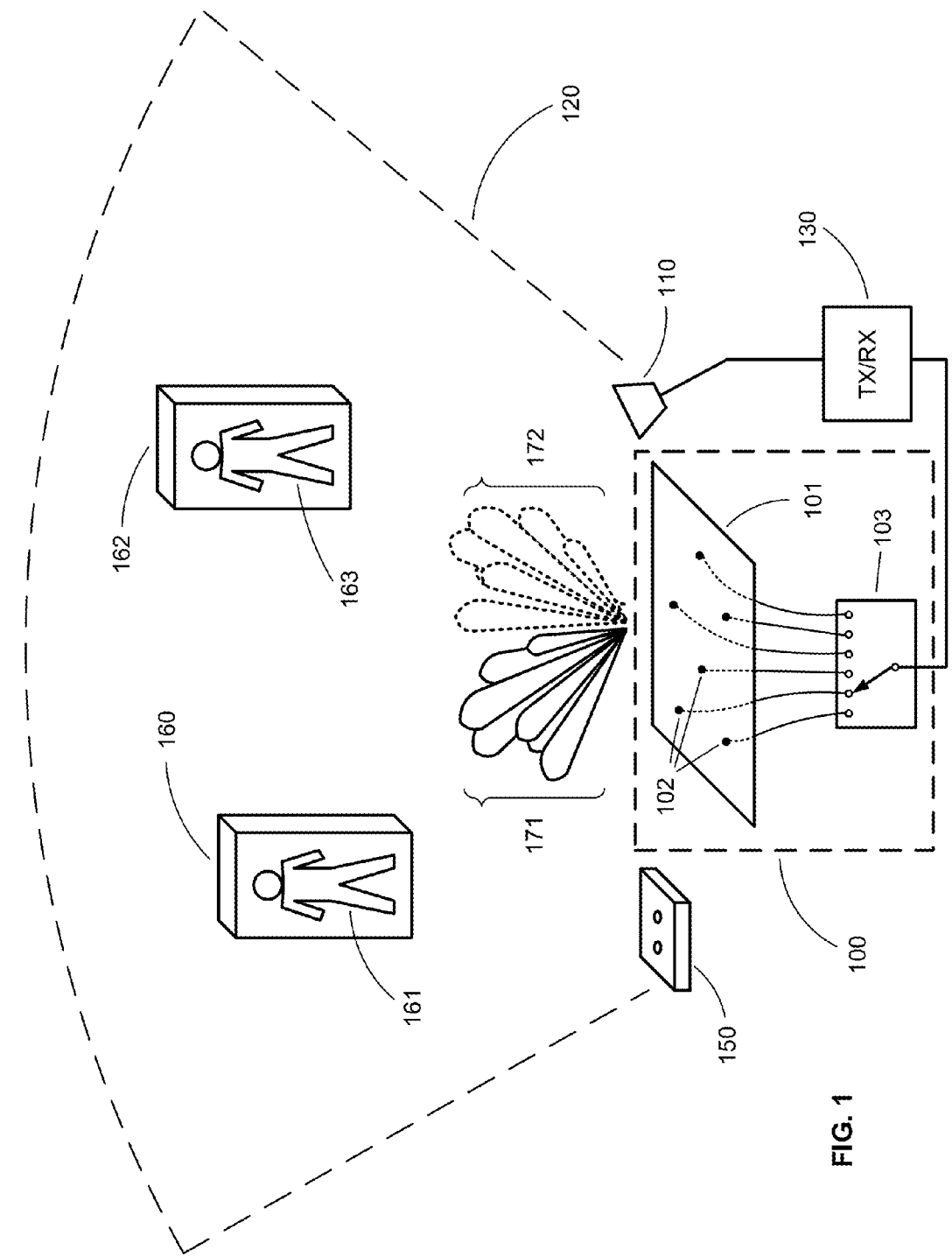
FIG. 1 depicts imaging with a multi-sensor compressive imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Compressive imaging systems, such as those described in PCT Application No. PCT/US13/40444, provide an imaging tool suitable for applications including holography, microwave imaging, microwave/mmW imaging, human tracking, security imaging, and threat detection. Embodiments may utilize metamaterial aperture antennas for illuminating a scene and/or measuring a scene, with various examples of metamaterial aperture antennas described in: the above-mentioned PCT application (published as PCT Publication No. WO/2014/025425); A. Bily et al, "Surface Scattering Antennas," U.S. Patent Publication No. 2012/0194399; and A. Bily et al, "Surface Scattering Antenna Improvements," U.S. Patent Publication No. 2014/0266946; and P.-Y. Chen et al, "Surface Scattering Antennas with Lumped Elements," U.S. application Ser. No. 14/506,432; each herein incorporated by reference.

In some embodiments a compressive imaging system includes both an RF imaging component (such an a metamaterial surface antenna) and an auxiliary sensing component such (as an EO/IR sensor) to provide a multi-sensor integrated imaging system. An illustrative approach is depicted in FIG. 1. The figure shows an illumination antenna 100 and a measurement antenna 110 addressing a field of view 120. This configuration is not intended to be limiting: in other approaches, the same antenna is utilized both for illumination and measurement; in yet other approaches, multiple antennas are utilized for illumination and/or multiple antennas are utilized for measurement.

In the figure, the field of view is also addressed by an auxiliary sensor unit 150 that is operable to identify a region of interest within the field of view. For example, the sensor unit may include a structured light sensor unit. A structured light sensor, such as a PRIMESENSE sensor or a MICROSOFT KINECT unit (which embeds a PRIMESENSE sensor), can obtain depth information about a scene by projecting a pattern of light (such as infrared light) on the scene and then observing how the pattern falls on the elements of the scene. See, for example, Z. Zalevsky et al., "Method and system for object reconstruction," U.S. Patent Publication No. 2013/0155195, herein incorporated by reference. The depth information can be used for object recognition, especially to identify the location and/or posture of a human target within the field of view of the sensor unit. See, for example, J. Shotton et al, "Real-time human pose recognition in parts from single depth images," *Communications of the ACM*, Vol. 56, No. 1, January 2013, pp. 116-124, herein incorporated by reference. In other approaches, the sensor unit may include: other EO/IR sensors such as a LIDAR unit, an optical camera, a video camera, or a stereo camera; acoustic sensors such as an ultrasonic sonar unit; tactile sensors such as touch-sensitive floor coverings; other RF sensors; or combinations thereof. While the figure depicts a single sensor unit 150, other embodiments may deploy a plurality of sensor units, e.g. to cover the field of view from multiple vantages (such as front, back, side, top, and/or bottom) or to provide an extended field of view (such as along a corridor).

The sensor unit 150 may identify a region of interest by determining spatial information about a subject within the field of view 120. The spatial information can include the position, orientation, or posture of a human subject, and the region of interest may be defined as a volume that encloses or partially encloses the human subject. In the illustrative depiction of FIG. 1, this volume is depicted as a box 160 that encloses a subject 161 within the field of view. In other approaches, the volume is a human-shaped volume enclosing and matching the posture of the human subject. In yet other approaches, the volume is determined using a depth map characterizing a surface region of the subject, e.g. as provided by a structured light sensor unit. For example, the volume may be defined as a curved slab-like volume that hugs the contours of the human subject; in other words, for a depth map that defines a two-dimensional manifold corresponding to the surface region, the region of interest is a curved slab corresponding to a three-dimensional neighborhood of the two-dimensional manifold. The thickness of this curved slab may be selected as appropriate for the imaging application, ranging, for example, from about 1 centimeter to about 10 centimeters.

In the figure, the illumination antenna 100 is depicted as a metamaterial aperture antenna. Various examples of metamaterial aperture antennas are described in the references cited above. In this particular example, the metamaterial aperture antenna is a reconfigurable antenna that includes a two-dimensional waveguide 101 with a plurality of waveguide feeds 102 spatially distributed across the extent of the waveguide. An RF switch 103 is configured to direct RF energy from a radio unit 130 to any of the various feed locations. In the example, the waveguide is coupled to an array of complementary metamaterial elements (not shown) having a diversity of resonance frequencies, e.g. as described in PCT Publication No. WO/2014/025425. In one contemplated mode of operation of this illumination antenna, the RF switch is sequentially adjusted to direct RF energy to each of the various feed locations, and for each position of the RF switch, the radio unit 130 sweeps through a range or set of operating frequencies to utilize the frequency dispersion of the array of complementary metamaterial elements (again as described in PCT Publication No. WO/2014/025425).

In the figure, the measurement antenna 110 is a horn antenna (or similar medium gain antenna addressing the field of view). In other embodiments, the configuration is swapped: the illumination antenna is a horn antenna (or similar medium gain antenna addressing the field of view) and the measurement antenna is a metamaterial aperture antenna. In yet other embodiments, both the illumination antenna and the measurement antenna are metamaterial aperture antennas. In yet other embodiments, a single metamaterial aperture antenna provides both illumination and measurement. Throughout this disclosure, where details of the illumination antenna and its operation are described, similar details are contemplated for various embodiments of the measurement antenna and its operation, and similar details are contemplated for an antenna that functions both as illumination antenna and measurement antenna.

In some approaches, the illumination and/or measurement of the scene are performed in the same way regardless of the actual region of interest: the entire field of view is illuminated, and the entire field of view is measured. In other approaches, such as that depicted in FIG. 1, the illumination and/or measurement of the scene are tailored in accordance with the identifying of a region of interest by the auxiliary sensor unit. Thus, in the example of FIG. 1, when the sensor unit 150 identifies a first region of interest 160 enclosing the position of a subject 161, the first region of interest 160 is illuminated with a first set of illumination field patterns 171; when the sensor unit 150 identifies a second region of interest 162 enclosing the position of a subject 163, the second region of interest 162 is illuminated with a second set of illumination field patterns 172. The subject 163 may be a second subject within the field of view 120, or the same subject 161 at a later time (e.g. if the subject is moving through the field of view).

In various approaches, the illumination antenna is frequency dispersive, reconfigurable, or both. An example of a frequency-dispersive antenna is a metamaterial aperture antenna having a plurality of metamaterial elements arranged on a surface and having a diversity of resonance frequencies, e.g. as described in PCT Publication No. WO/2014/025425. A frequency-dispersive antenna may be operated by sweeping through a set of operating frequencies to illuminate the field of view with a corresponding set of radiation patterns. Alternatively, if it is desirable to concentrate the illumination on a smaller region of interest within the field of view, in some approaches a subset of the operating frequencies may be selected, corresponding to a subset of radiation patterns that are concentrated in the region of interest.

Figure 2A:
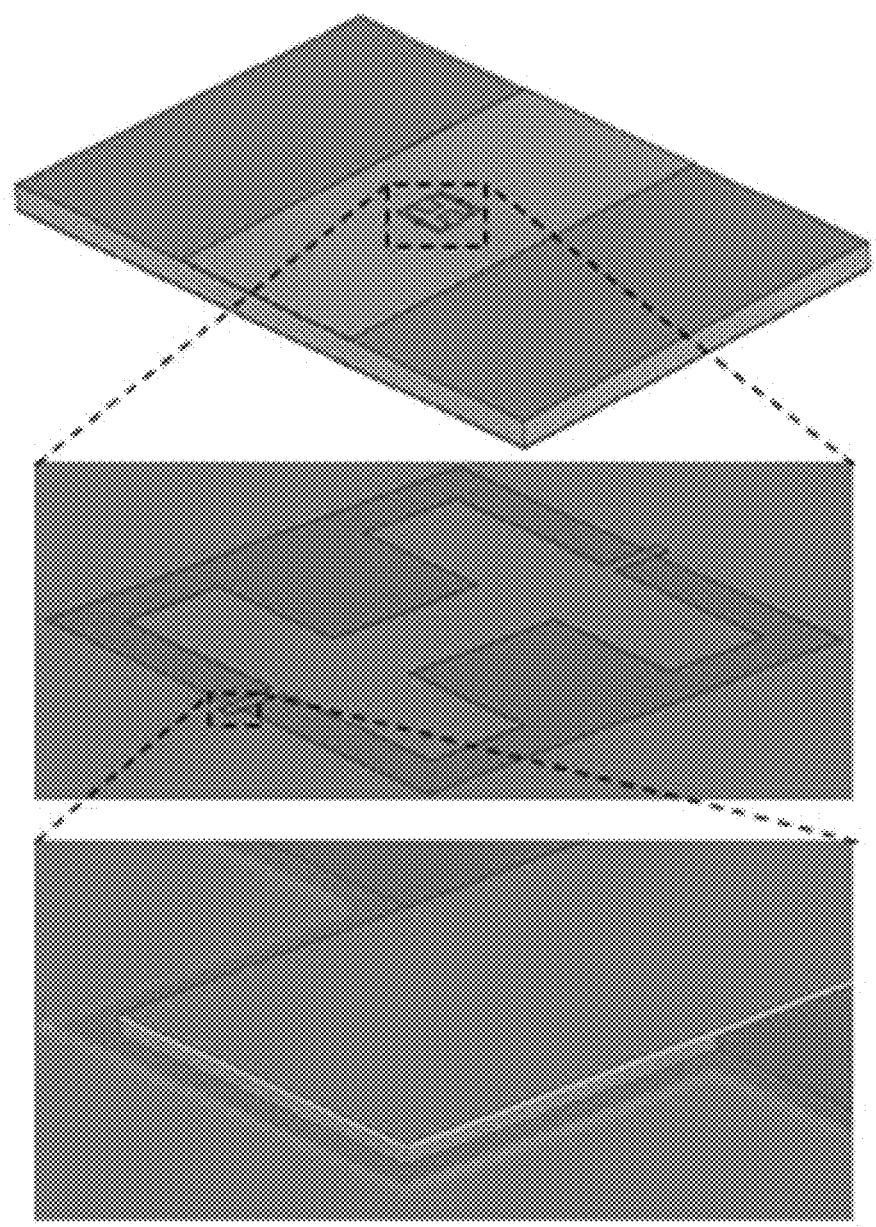
FIG. 2A depicts a Shottky junction-tuned metamaterial element.
Figure 2B:
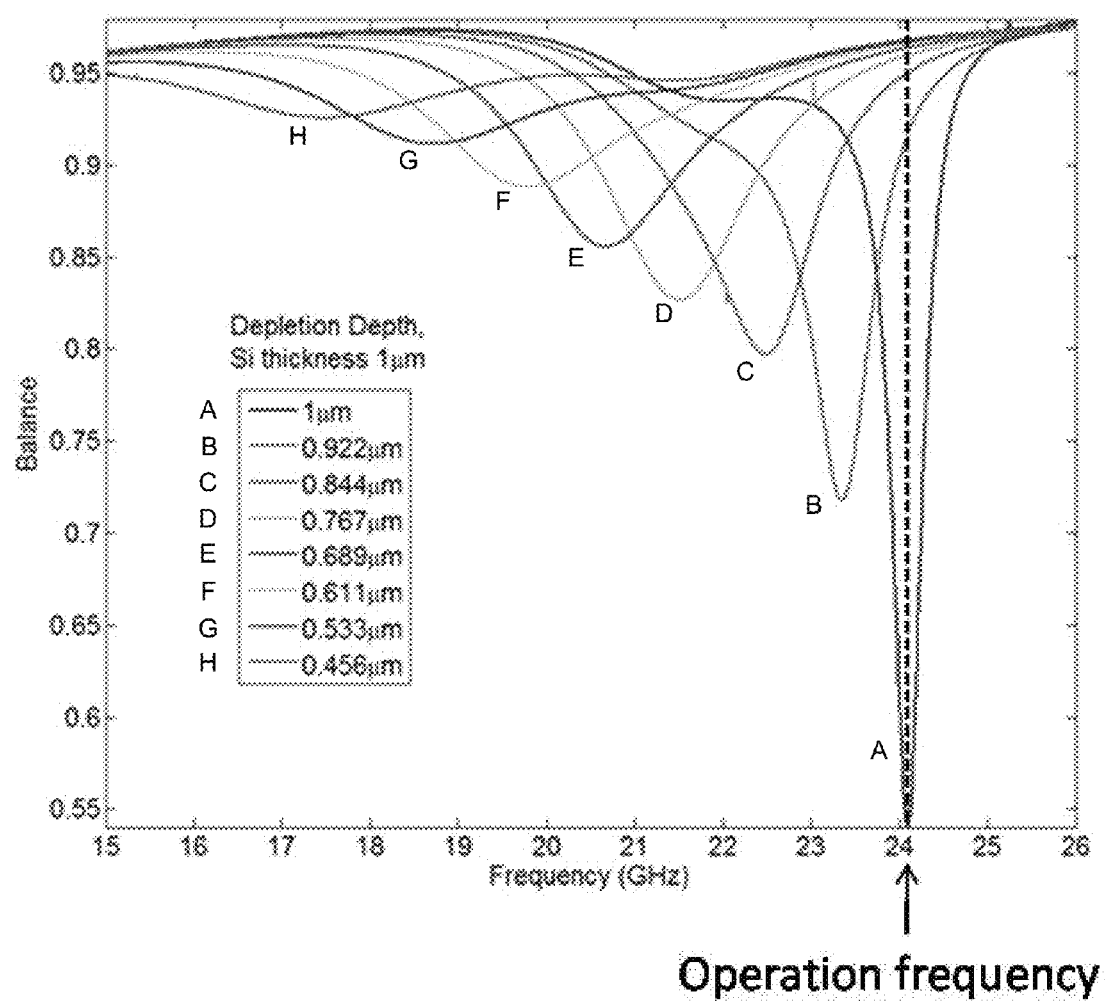
FIG. 2B depicts a tunable frequency response of a Shottky junction-tuned metamaterial element.
Figure 3A:
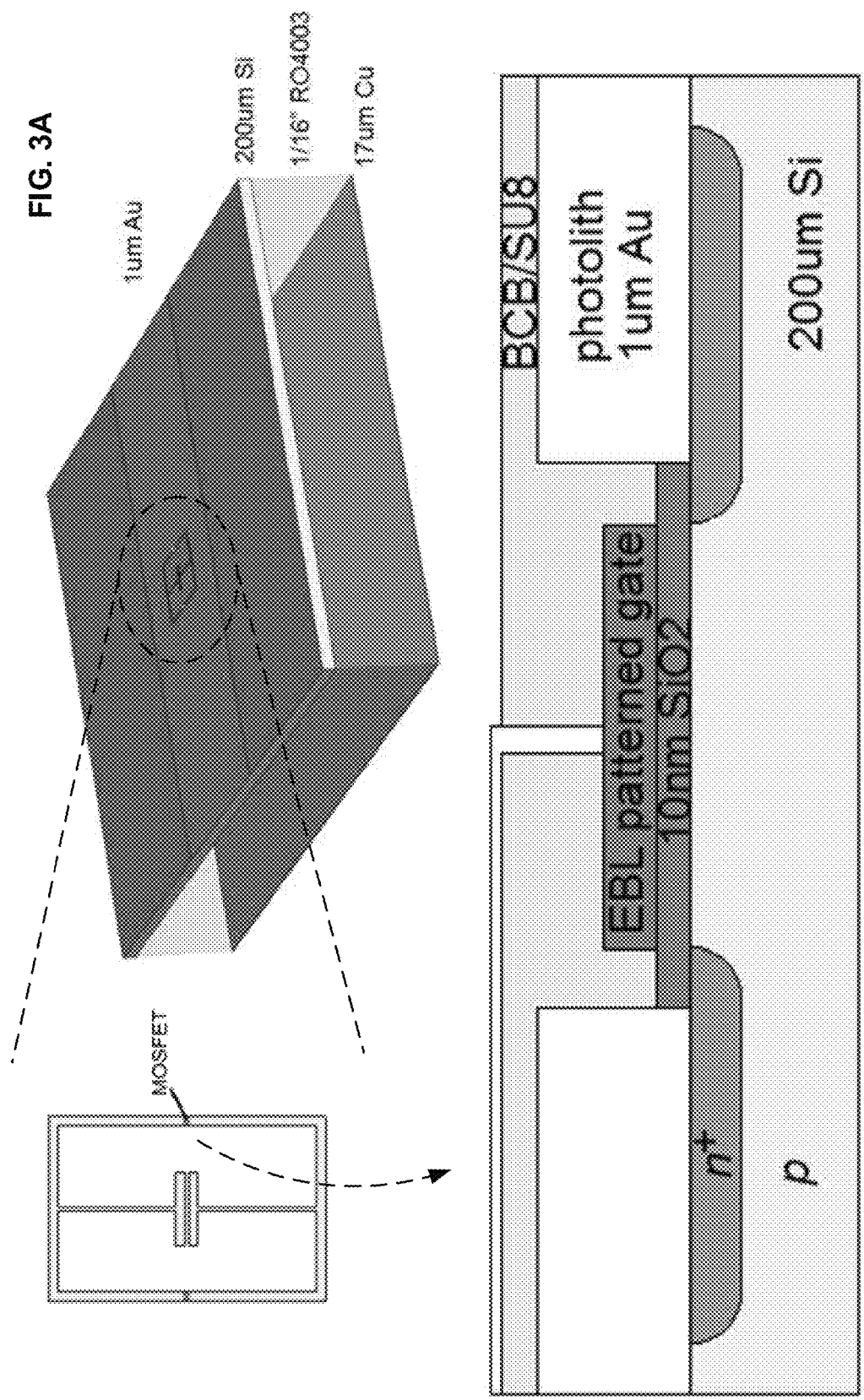
FIG. 3A depicts a MOSFET-tuned metamaterial element.
Figure 3B:
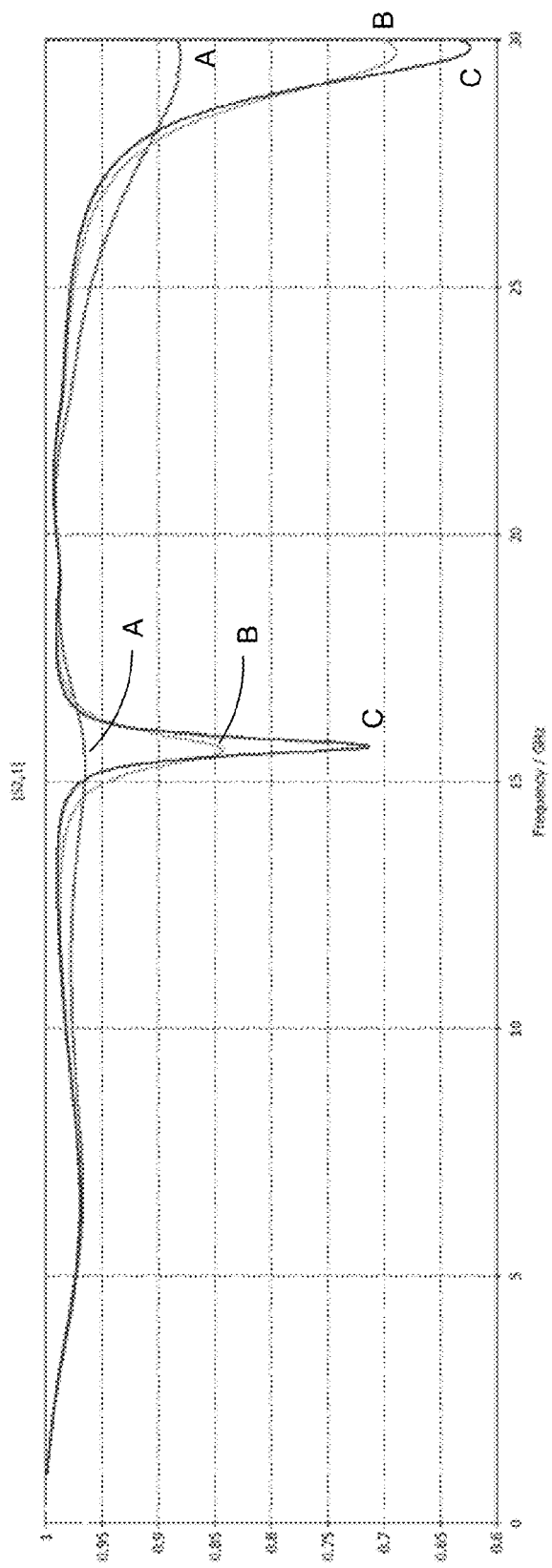
FIG. 3B depicts a tunable frequency response of a MOSFET-tuned metamaterial element.

An example of a reconfigurable antenna is a metamaterial aperture antenna having a plurality of radiation patterns corresponding to a set of antenna configurations that are functions of one or more control inputs. Examples of such antennas are described in PCT Publication No. WO/2014/025425, U.S. Patent Publication No. 2012/0194399, U.S. Patent Publication No. 2014/0266946, and U.S. application Ser. No. 14/506,432, each herein incorporated by reference. In some approaches, the reconfigurable metamaterial aperture antenna has a plurality of adjustable metamaterial elements with respective adjustable physical parameters (such as resonance frequencies and/or Q-factors) that are functions of one or more control inputs. The control inputs may be control voltages for the plurality of scattering elements. A first example of an adjustable metamaterial element is depicted in FIG. 2A, which depicts a complementary metamaterial element having an inner conducting region that is electrically isolated from an enclosing conducting region. As depicted in the figure, a pair of Schottky diodes span the gap between the inner conducting region and the enclosing conducting region; a voltage difference applied between the two conductors changes the depletion depths of the diodes, adjusting the resonance frequency and Q-factor of the resonator as shown in FIG. 2B. A second example of an adjustable metamaterial element is depicted in FIG. 3A, which again depicts a complementary metamaterial element having an inner conducting region that is electrically isolated from an enclosing conducting region, this time with a pair of MOSFETs spanning the gap between the inner conducting region and the enclosing conducting region. As shown in FIG. 3B, a voltage applied to the gates of the MOSFETs adjusts the Q-factor of the resonator by altering the conductivity of each MOSFET (the figure depicts full-wave simulation results for the signal transmitted through a microstrip patterned with a single MOSFET-tuned CELC—each curve corresponds to a different source-drain resistance, corresponding to gate voltage). In other approaches described in U.S. application Ser. No. 14/506,432, the metamaterial elements are adjustable by the inclusion of tunable lumped elements such as packaged varactor diodes or HEMT transistors.

In some approaches the illumination antenna is both frequency-dispersive and reconfigurable. One example is the illumination antenna of FIG. 1, which is operable over a set of frequencies and also reconfigurable by adjusting the RF switch. Another example is a frequency-dispersive antenna that is mechanically steered (e.g. by mounting the antenna on a pivot or gimbal, or by directing the antenna energy towards a secondary reflector or refractor that is mechanically steered) or electronically steered (e.g. by directly the antenna energy towards a secondary reflector or refractor that is electronically steered). The reconfigurable antennas of the preceding paragraph are also frequency-dispersive, and may be operated in a set of antenna modes that include both a plurality of frequencies and a plurality of configurations.

In some approaches a set of illumination antennas is deployed, and one or more of the illumination antennas is selected for the illumination depending on the region of interest. For example, a set of illumination antennas may be deployed along a corridor, and an illumination antenna is selected adjacent to the position of a subject in the corridor.

After illumination and measurement of the scene, a reconstructed image is obtained using a compressive imaging algorithm, e.g. as described in PCT Publication No. WO/2014/025425. In some approaches, the reconstruction is performed in the same way regardless of the actual region of interest: the minimization problem arg $\min_f \|g - Hf\|_2^2 + \lambda R(f)$ for is solved for a reconstructed image f and measurement matrix H defined over the entire field of view. In other approaches, the reconstruction is informed and/or optimized by information received from the auxiliary sensor unit. For example, the measurement matrix H may be truncated to exclude points outside of the region of interest (equivalently, the reconstructed image f is stipulated as zero outside of the region of interest). In some approaches this truncation involves a dimensional reduction of the minimization problem; for example, if the auxiliary sensor unit provides a depth map characterizing a surface region of the subject (e.g. as provided by a structured light sensor unit), the measurement matrix H and reconstructed image f may be defined not in a three-dimensional volume but on a two-dimensional manifold (embedded in three-dimensional space) corresponding to the depth map. Alternatively or additionally, the auxiliary sensor unit can inform the reconstruction by providing boundary conditions for Green's functions of the measurement matrix H; in other words, the Green's functions are recalculated using, for example, the two-dimensional manifold discussed above as a boundary on the space in which the Green's functions are defined.

Figure 4:
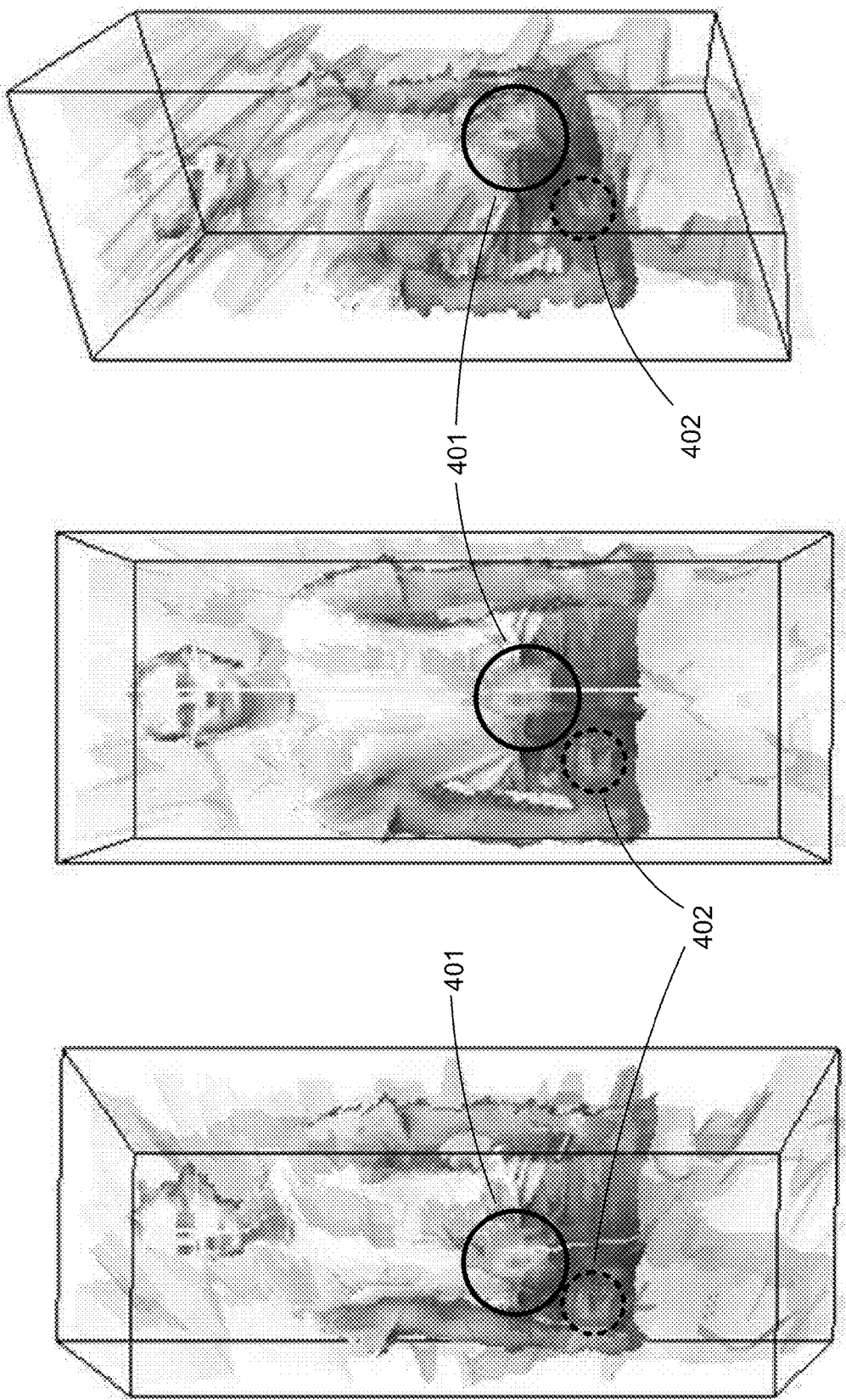
FIG. 4 depicts a three-dimensional image combining visual and RF data.

In some approaches, particularly in security imaging and threat detection scenarios, the reconstructed image f may be combined with a visual image of the region of interest to provide a multi-spectral representation of the region of interest. For example, the auxiliary sensor unit may provide both a depth map (e.g. as provided by a structure light sensor unit) and an optical image (e.g. as provided by an optical camera), as with the MICROSOFT KINECT sensor unit. Using a graphics processing unit (GPU), the depth map and optical image can be combined with a false-color representation of the reconstructed image f to create a three-dimensional image data object. This three-dimensional object can then be displayed to the user on a monitor. An example is presented in FIG. 4, which shows three perspectives of a subject imaged with both a MICROSOFT KINECT and an RF compressive imaging system, In these perspectives, a false-color representation of the RF imaging data is overlaid on a three-dimensional visual image object, showing metallic objects (in this case, keys 401 and a belt buckle 402) that appear in the RF image.

In some approaches an interactive user interface, such as a touch screen, allows the user to interact with the three-dimensional image data object and/or select further regions of interest for additional imaging. For example, the user can operate the touch screen interface (or other user interface) to zoom or rotate the three-dimensional image. Alternatively or additionally, the user can operate the touch screen interface (or other user interface) to identify another region of interest (for example, a smaller region of interest addressing a particular feature or portion of the larger region of interest) for subsequent RF imaging. For example, if the initial image data object reveals an area of concern or ambiguity, the user can identify this area of concern or ambiguity (e.g. by drawing a loop on the touch screen) and prompt the imaging system to re-image with a new region of interest corresponding to the identified area.

Figure 5:
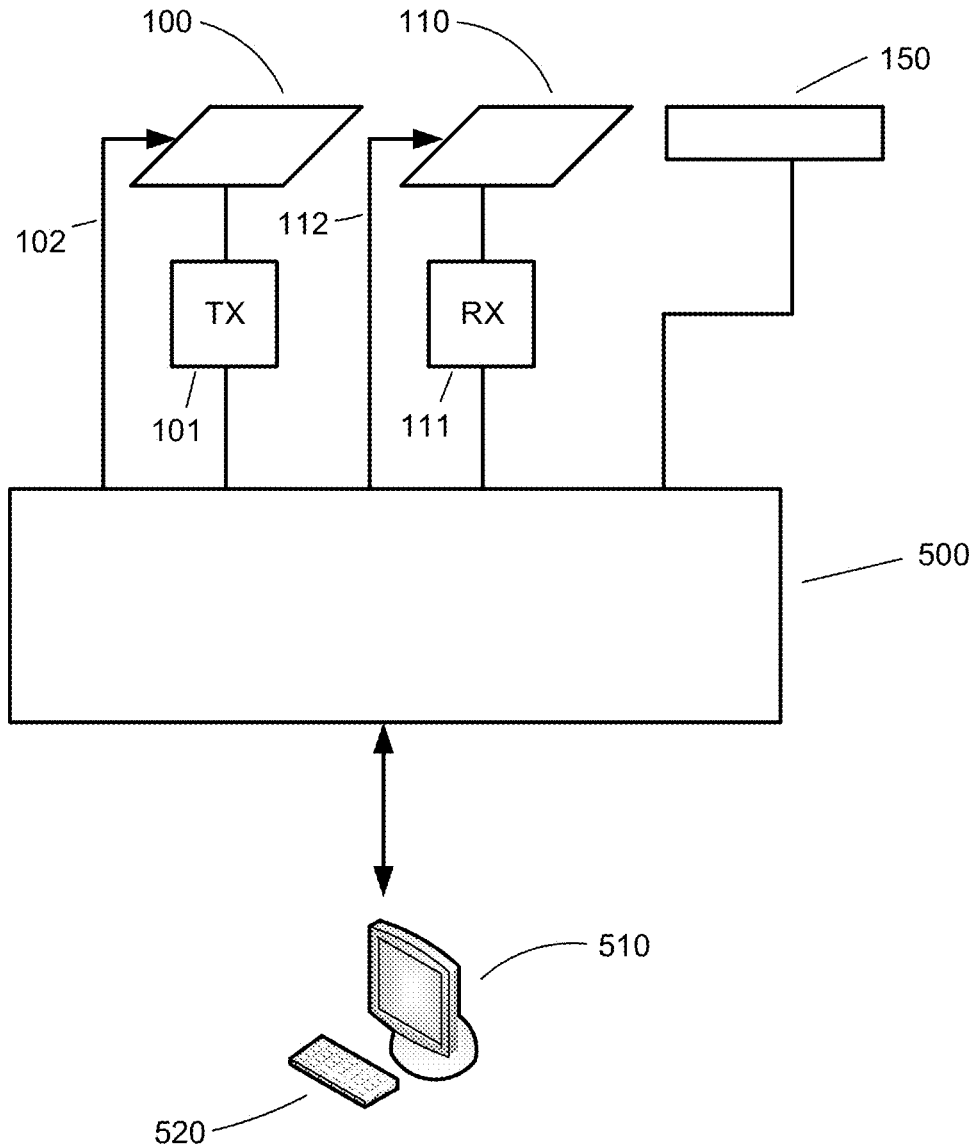
FIG. 5 depicts a system block diagram.

With reference now to FIG. 5, an illustrative embodiment is depicted as a system block diagram for a multi-sensor compressive imaging system. The system includes an illumination antenna 100 coupled to a transmitter 101 and a measurement antenna 110 coupled to a receiver 111. The system further includes an auxiliary sensor unit 150, which may include a EO/IR sensor (such as a MICROSOFT KINECT sensor), an acoustic sensor (such as an ultrasonic sonar unit), a tactile sensor (such as a touch-sensitive floor covering), or combination thereof. The transmitter 101, receiver 111, and sensor unit 150 are coupled to processing circuitry 500 configured to reconstruct an image of the region of interest using a compressive imaging algorithm. For embodiments where the illumination antenna is a reconfigurable antenna, the processing circuitry 500 includes control circuitry providing one or more control inputs 102 to the illumination antenna. Similarly, for embodiments where the measurement antenna is a reconfigurable antenna, the processing circuitry 500 includes control circuitry providing one or more control inputs 112 to the measurement antenna. The system optionally includes a monitor 510 coupled to the processing circuitry 500 for display of reconstructed images (optionally combined with a depth map and visual image to provide a projection of a hybrid, false color three dimensional image as discussed above). Finally, the system optionally includes a user interface 520 (schematically depicted as a keyboard, but this schematic representation is not intended to be limiting) coupled to the processing circuitry to allow a user to manipulate displayed images and/or select new regions of interest, as discussed above. In some approaches, the monitor 510 and user interface 520 are combined in the form of a touch-screen monitor.

The content of the article "Metamaterial Microwave Holographic Imaging System" by Hunt et al., published by the Optical Society of America on October 2014 (J. Opt. Soc. Am. Vol. 31, No. 10), is hereby incorporated by reference in its entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A method, comprising:
   identifying a region of interest within a field of view, wherein the identifying includes determining spatial information about a subject, the spatial information including a depth map characterizing a surface region of the subject, wherein the depth map defines a two-dimensional manifold corresponding to the surface region;

illuminating the region of interest with one or more illumination field patterns;

observing the illuminated region of interest with one or more measurement field patterns; and reconstructing an image of the region of interest using a compressive imaging algorithm, where the reconstructing depends on both the depth map and data from the observing.

2. The method of claim 1, wherein the determining includes determining by optical or infrared sensing.

3. The method of claim 1, wherein the determined spatial information includes subject location information.

4. The method of claim 1, wherein the determined spatial information includes subject orientation information.

5. The method of claim 1, wherein the identified region of interest is a volume at least partially enclosing the subject.

6. The method of claim 1, wherein:

the illuminating of the region of interest includes illuminating the region of interest with the one or more illumination field patterns at one or more RF frequencies; and the observing of the illuminated region of interest includes observing the region of interest with a one or more measurement field patterns at the one or more RF frequencies.

7. The method of claim 1, where the illumination field patterns and the measurement field patterns define a measurement matrix H, the data from the observing includes a collection of measurements g, and the compressive imaging algorithm solves the minimization problem arg $\min_f \|g-Hf\|_2^2 + \lambda R(f)$ for a reconstructed image f, where $\lambda$ is a regularization parameter and R(f) is a prior knowledge function.

8. The method of claim 7, where the compressive imaging algorithm is a Two-step Iterated Soft Thresholding (TwIST) algorithm.

9. The method of claim 7, where $R(f)=\|f\|_1$.

10. The method of claim 7, wherein the region of interest is at least partially prescribed by the depth map, and the reconstructing that depends on both the depth map and the data from the observing comprises a reconstructing wherein the measurement matrix H is defined only within the region of interest and the reconstructed image f is zero outside the region of interest.

11. The method of claim 7, wherein:

the identifying of the region of interest includes determining a depth map characterizing a surface region of a subject; and wherein the reconstructing that depends on both the depth map and the data from the observing comprises a reconstructing wherein the two-dimensional manifold provides a boundary condition for Green's functions of the measurement matrix H.

12. The method of claim 7, wherein:

the identifying of the region of interest includes determining a depth map characterizing a surface region of a subject; and wherein the reconstructing that depends on both the depth map and the data from the observing comprises a reconstructing wherein:

the measurement matrix H is defined only on the two-dimensional manifold; and the reconstructed image f is a two-dimensional reconstructed image defined on the two-dimensional manifold.

13. The method of claim 1, further comprising:

capturing an optical image of the subject;

combining the depth map, the optical image, and a false-color representation of the reconstructed image to create a three-dimensional image data object.

14. A system, comprising:

an illumination antenna having one or more illumination field patterns within a field of view;

a measurement antenna having one or more measurement field patterns within the field of view;

a sensor unit operable to identify a region of interest within the field of view and to provide spatial information about a subject within the region of interest, the spatial information including a depth map characterizing a surface region of the subject, wherein the depth map defines a two-dimensional manifold corresponding to the surface region;

a transmitter coupled to an input port of the illumination antenna;

a receiver coupled to an output port of the measurement antenna; and processing circuitry coupled to the transmitter, the receiver, and the sensor unit and configured to reconstruct an image of the region of interest using a compressive imaging algorithm that depends on both the depth map and the data from the receiver.

15. The system of claim 14, wherein the sensor unit includes an optical or infrared sensor unit.

16. The system of claim 15, wherein the optical or infrared sensor unit includes a structured light sensor unit.

17. The system of claim 15, wherein the optical or infrared sensor unit includes an optical or infrared camera.

18. The system of claim 14, wherein:

the sensor unit is configured to provide a depth map and an optical image of a subject in the field of view; and the processing circuitry includes a graphics processing unit configured to combine the depth map, the optical image, and a false color representation of the reconstructed image as a three-dimensional graphics image object.

19. The system of claim 18, further comprising:

a monitor coupled to the processing circuitry, wherein the graphics processing unit is configured to display the three-dimensional graphics image object on the monitor.

20. The system of claim 19, wherein the monitor is a touch-screen monitor.

21. The system of claim 20, wherein the graphics processing unit is configured to zoom or rotate the three-dimensional graphics image object responsive to a gesture on the touch-screen monitor.

22. The system of claim 18, further comprising: a user interface coupled to the processing circuitry.

23. The system of claim 22, wherein the graphics processing unit is configured to zoom or rotate the three-dimensional graphics image object responsive to an input from the user interface.

24. A system, comprising:

an antenna having a set of radiation patterns within a field of view;

a sensor unit operable to identify a region of interest within the field of view and to provide spatial information about a subject within the region of interest, the spatial information including a depth map characterizing a surface region of the subject, wherein the depth map defines a two-dimensional manifold corresponding to the surface region;

a transceiver coupled to the antenna; and processing circuitry coupled to the transceiver and the sensor unit and configured to reconstruct an image of the region of interest using a compressive imaging algorithm that depends on both the depth map and the data from the transceiver.

25. The system of claim 24, wherein the sensor unit includes an optical or infrared sensor unit.

26. The system of claim 25, wherein the optical or infrared sensor unit includes a structured light sensor unit.

27. The system of claim 25, wherein the optical or infrared sensor unit includes an optical or infrared camera.

28. The system of claim 24, wherein:
the sensor unit is configured to provide a depth map and an optical image of a subject in the field of view; and
the processing circuitry includes a graphics processing unit configured to combine the depth map, the optical image, and a false color representation of the reconstructed image as a three-dimensional graphics image object.

29. The system of claim 28, further comprising:
a monitor coupled to the processing circuitry,
wherein the graphics processing unit is configured to display the three-dimensional graphics image object on the monitor.

30. The system of claim 28, wherein the monitor is a touch-screen monitor.

31. The system of claim 29, wherein the graphics processing unit is configured to zoom or rotate the three-dimensional graphics image object responsive to a gesture on the touch-screen monitor.

32. The system of claim 28, further comprising: a user interface coupled to the processing circuitry.

33. The system of claim 31, wherein the graphics processing unit is configured to zoom or rotate the three-dimensional graphics image object responsive to an input from the user interface.

34. The method of claim 2, wherein the optical or infrared sensing includes structured light sensing.

35. The system of claim 14, wherein:
the illumination field patterns and the measurement field patterns define a measurement matrix H;
the region of interest is at least partially prescribed by the depth map; and
the processing circuitry is configured to reconstruct the image of the region of interest using a compressive imaging algorithm that depends on both the depth map and the data from the receiver by truncating the measurement matrix H outside the region of interest or stipulating that the reconstructed image f is zero outside the region of interest.

36. The system of claim 14, wherein:
the spatial information includes a depth map characterizing a surface region of the subject;
the illumination field patterns and the measurement field patterns define a measurement matrix H; and
the processing circuitry is configured to reconstruct the image of the region of interest using a compressive imaging algorithm that depends on both the depth map and the data from the receiver by using the two-dimensional manifold to provide a boundary condition for Green's functions of the measurement matrix H.

37. The system of claim 14, wherein:
the spatial information includes a depth map characterizing a surface region of the subject;
the illumination field patterns and the measurement field patterns define a measurement matrix H; and
the processing circuitry is configured to reconstruct the image of the region of interest using a compressive imaging algorithm that depends on both the depth map and the data from the receiver by restricting the measurement matrix H or the reconstructed image f to points on the two-dimensional manifold.

38. The system of claim 24,
wherein the radiation patterns define a measurement matrix H;
wherein the region of interest is at least partially prescribed by the depth map; and
wherein the processing circuitry is configured to reconstruct the image of the region of interest using a compressive imaging algorithm that depends on both the depth map and the data from the transceiver by truncating the measurement matrix H outside the region of interest or stipulating that the reconstructed image f is zero outside the region of interest.

39. The system of claim 24,
wherein the spatial information includes a depth map characterizing a surface region of the subject;
wherein the radiation patterns define a measurement matrix H; and
wherein the processing circuitry is configured to reconstruct the image of the region of interest using a compressive imaging algorithm that depends on both the depth map and the data from the transceiver by using the two-dimensional manifold to provide a boundary condition for Green's functions of the measurement matrix H.

40. The system of claim 24,
wherein the spatial information includes a depth map characterizing a surface region of the subject;
the radiation patterns define a measurement matrix H; and
the processing circuitry is configured to reconstruct the image of the region of interest using a compressive imaging algorithm that depends on both the depth map and the data from the transceiver by restricting the measurement matrix H or the reconstructed image f to points on the two-dimensional manifold.

\* \* \* \* \*